United States Patent
Thurow

(10) Patent No.: US 6,752,388 B2
(45) Date of Patent: Jun. 22, 2004

(54) SPRING ARRANGEMENT HAVING A DOUBLE ROLLING-LOBE FLEXIBLE MEMBER

(75) Inventor: Gerhard Thurow, Garbsen (DE)

(73) Assignee: ConiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 10/314,203

(22) Filed: Dec. 9, 2002

(65) Prior Publication Data

US 2003/0164584 A1 Sep. 4, 2003

(30) Foreign Application Priority Data

Dec. 22, 2001 (DE) .......................................... 101 63 829

(51) Int. Cl.[7] ................................................. F16F 9/04
(52) U.S. Cl. .................. 267/122; 267/64.27; 267/64.24
(58) Field of Search .............................. 267/122, 64.27, 267/64.23, 64.24, 64.21, 64.19, 64.25; 280/276

(56) References Cited

U.S. PATENT DOCUMENTS

| 1,177,142 A | * | 3/1916 | Rudd ....................... 267/64.24 |
| 2,846,983 A | * | 8/1958 | Otto ........................... 267/122 |
| 3,168,278 A | * | 2/1965 | Ogden ......................... 248/542 |
| 3,438,309 A | * | 4/1969 | Boileau ..................... 92/103 R |
| 4,493,481 A | * | 1/1985 | Merkle ..................... 267/64.27 |
| 4,682,753 A | * | 7/1987 | Clark .................... 267/140.13 |
| 6,375,170 B1 | | 4/2002 | Thurow et al. |
| 6,536,749 B1 | * | 3/2003 | Luhmann ................. 267/64.19 |

* cited by examiner

*Primary Examiner*—Douglas C. Butler
*Assistant Examiner*—Bradley King
(74) *Attorney, Agent, or Firm*—Walter Ottesen

(57) ABSTRACT

A spring arrangement includes two coaxial spring components (4a, 4b) which are mounted so as to oppose each other. Each of the spring components includes a rolling-lobe flexible member (6a, 6b) and a roll-off piston (8a, 8b) corresponding thereto. The two rolling-lobe flexible members (6a, 6b) define a common double rolling-lobe flexible member (6) and the two spring components (4a, 4b) have a common outer jacket (10). A simple assembly and a reliable fixation of the double rolling-lobe flexible member (6) on the outer jacket (10) is provided. For this purpose, the double rolling-lobe flexible member (6) has a clamp ring (18 or 26) mounted internally. The outer jacket (10) includes two parts (10a and 10b) having respective ends. The double rolling-lobe flexible member (6) is clamped between these ends with the aid of the clamp ring (18 and 26). The air spring arrangement is especially applicable in the forward wheel fork (16) of a two-wheel vehicle.

8 Claims, 3 Drawing Sheets

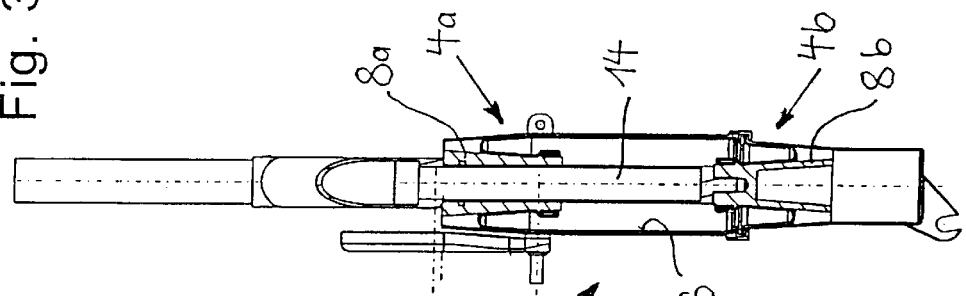
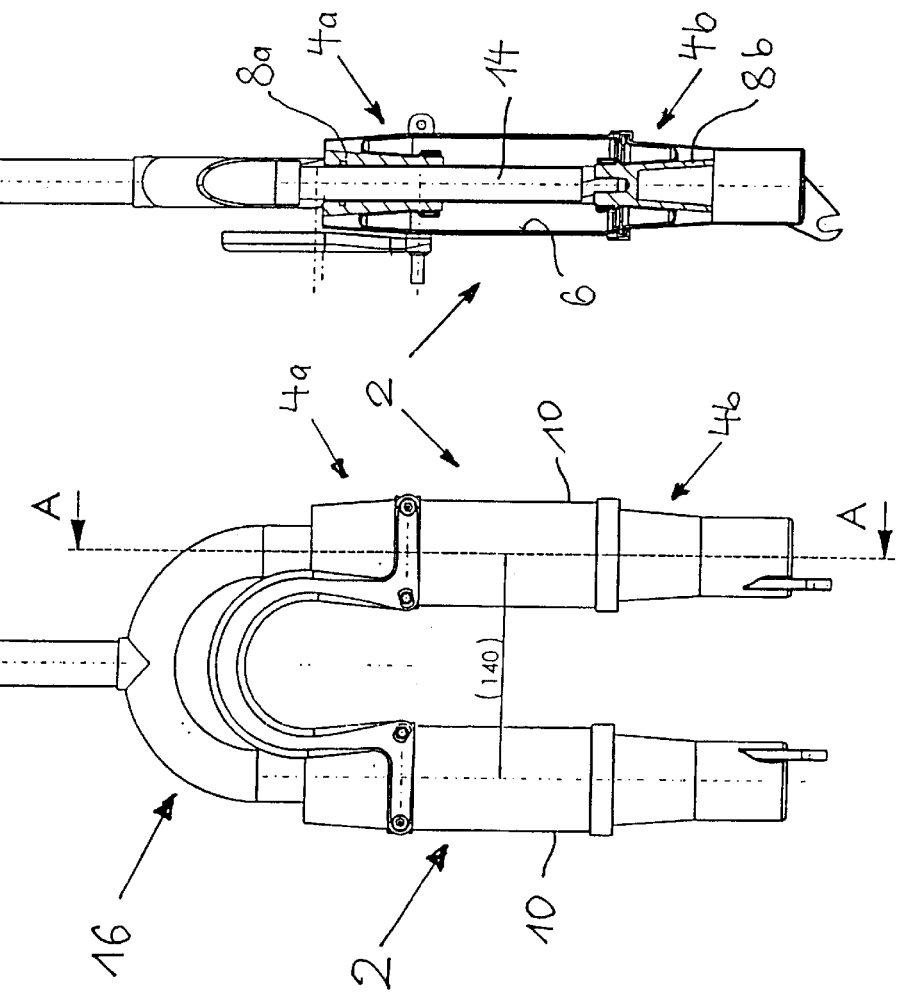
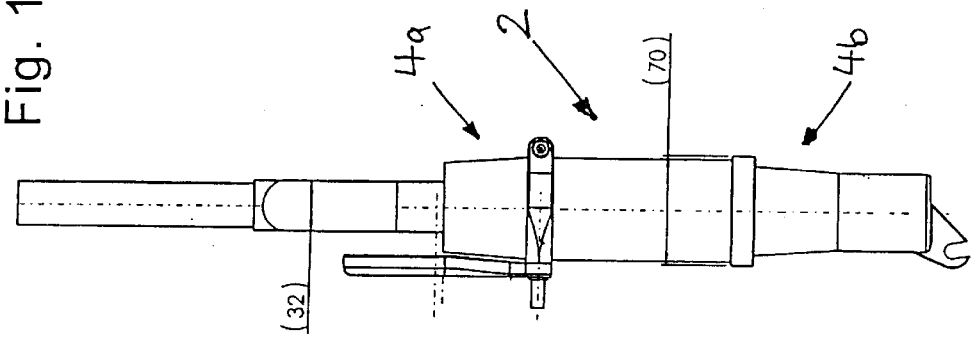

SPRING ARRANGEMENT HAVING A DOUBLE ROLLING-LOBE FLEXIBLE MEMBER

FIELD OF THE INVENTION

The invention relates to a spring system having a double rolling-lobe flexible member especially for use in the forward wheel fork of a two-wheel vehicle.

BACKGROUND OF THE INVENTION

U.S. Pat. No. 6,375,170 discloses a spring system having a double rolling-lobe flexible member. Such a spring system is made up of two air spring elements mounted as mirror images to each other. Each of the two spring elements comprises essentially a flexible member and a roll-off piston. A cover plate, which is required by a conventional air spring, can be omitted because a support unit (support bell, outer jacket) is provided for laterally delimiting the flexible members. In a preferred embodiment, the two flexible members define a single piece, that is, the two flexible members define a double rolling-lobe flexible member. The roll-off pistons are slightly conical at their ends and the outer jacket is configured to be slightly conical at both ends.

In a deflection operation, one part of the double rolling-lobe flexible member is compressed with the aid of the one roll-off piston, while, at the same time, the other part of the double rolling-lobe flexible member is relieved of load with the aid of the other roll-off piston. Because of the conicality of the outer jacket and roll-off pistons, there results an upper/lower asymmetry which has the consequence that the effective diameters of the two rolling lobes change from which a soft spring action results.

In the known spring system, the outer jacket is manufactured as a single piece. In the manufacture of the spring system, difficulties can occur because of the conically tapered ends of the outer jacket. A further unsolved problem lies in a reliable fixation of the double rolling-lobe flexible member on the outer jacket.

SUMMARY OF THE INVENTION

It is an object of the invention to provide a reliable positioning and fixing of the double rolling-lobe flexible member on the outer jacket and to furthermore provide a practical assembly of the air spring parts and especially of the outer jacket.

The spring arrangement of the invention includes: first and second spring components coaxially mounted in opposition to each other; the first spring component including a first rolling-lobe flexible member and a first roll-off piston; the second spring component including a second rolling-lobe flexible member and a second roll-off piston; the first and second rolling-lobe flexible members conjointly defining a common rolling-lobe flexible member having an interior; an outer jacket including first and second parts corresponding to the first and second spring components; the first and second parts having respective ends conjointly defining a common interface; the common rolling-lobe flexible member having a clamp ring arranged in the interior; and, the clamp ring being disposed between the ends with a portion of the flexible member being clamped between the ends and the clamp ring at the interface whereby a slippage of the flexible member relative to the outer jacket is prevented.

According to a feature of the invention, a clamp ring is mounted within the double rolling-lobe flexible member and is clamped between the ends of the two-part outer jacket. In this way, the double rolling-lobe flexible member is reliably fixed at the pregiven location. The double rolling-lobe flexible member is clamped between the clamp ring disposed internally and the outer jacket ends disposed externally. A slippage of the flexible member along the inner wall of the outer jacket is thereby prevented. The cover plates which are otherwise needed for the force transmission, especially in simple rolling-lobe flexible members, can be entirely omitted here. A further advantage of the two-part outer jacket is in the easy assembly of the spring system. Roll-off pistons and rolling-lobe flexible members need not be introduced via the conically tapered ends of a one-piece outer jacket. In lieu thereof, the assembly takes place via the relatively wide mutually facing ends of the outer jacket parts according to the invention.

With the use of a clamp nut, a releasable connection of the two outer jacket parts is obtained. In this way, the spring system can be disassembled and reassembled without difficulty.

A cost effective and nonetheless reliable fixation of the rolling-lobe flexible member at the outer jacket can be provided by means of a flanging procedure.

The clamp ring is preferably a flat ring. In lieu of a flat ring, also a flexible inner ring can be introduced into the pressureless flexible member to facilitate assembly.

BRIEF DESCRIPTION OF THE DRAWINGS

The invention will now be described with reference to the drawings wherein:

FIG. 1 is a side elevation view of a forward wheel fork of a bicycle equipped with a spring system according to an embodiment of the invention;

FIG. 2 is a front elevation of the forward wheel fork of FIG. 1;

FIG. 3 is a section view taken along line A—A of FIG. 2;

DESCRIPTION OF THE PREFERRED EMBODIMENTS OF THE INVENTION

Figure 4:
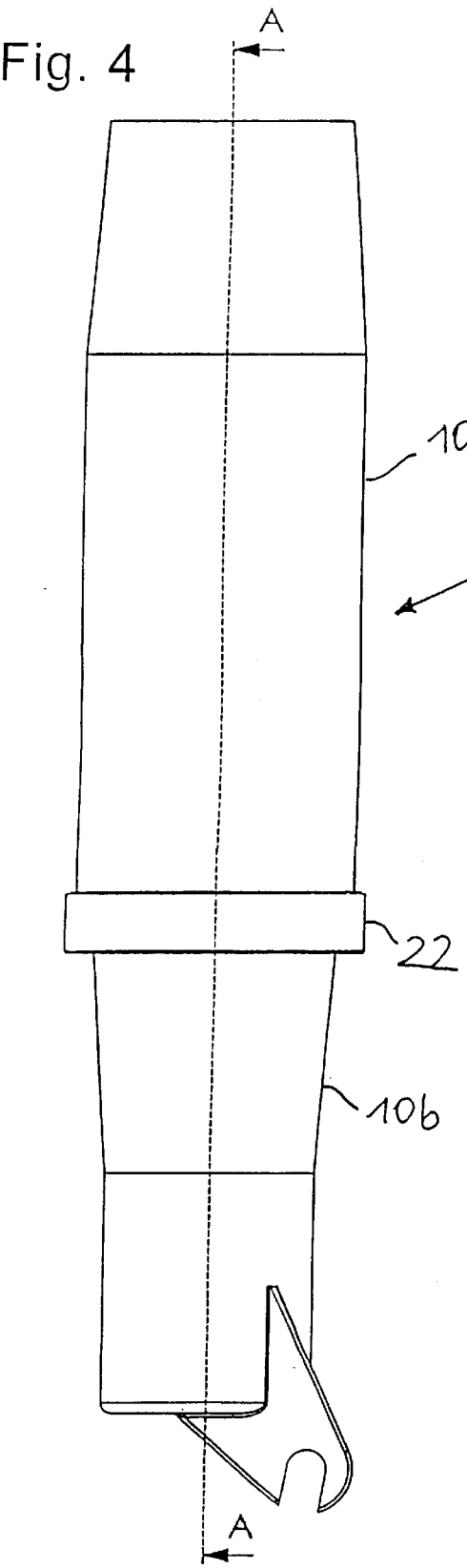
FIG. 4 is a side elevation view of the spring system according to the invention.
Figure 5:
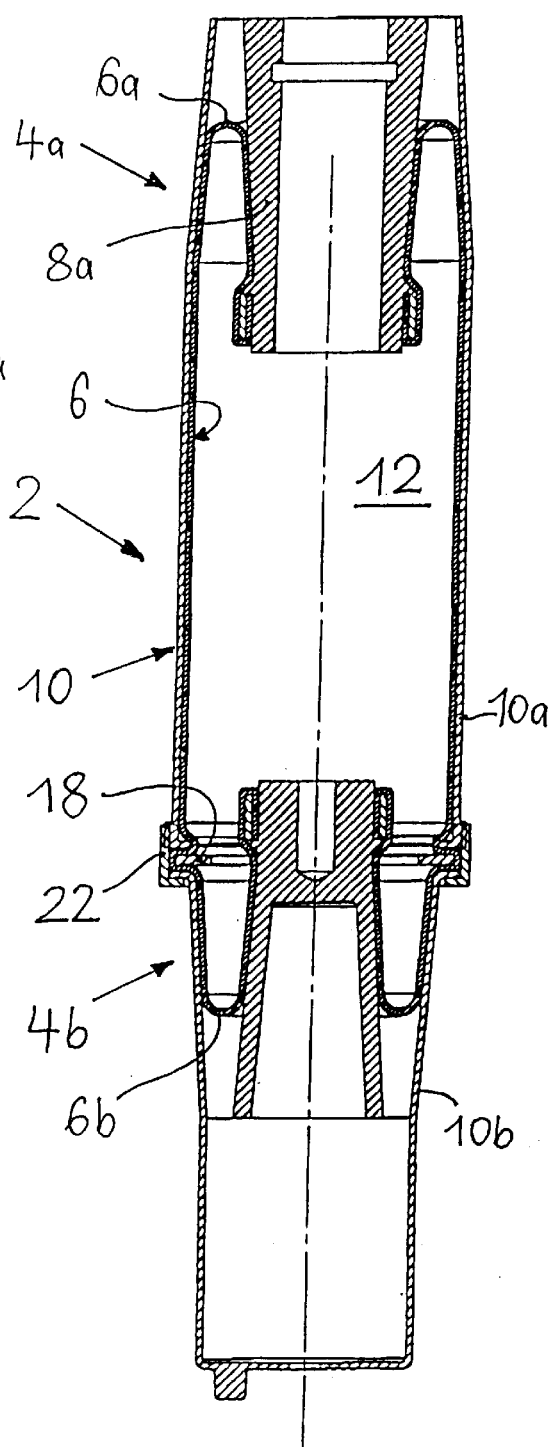
FIG. 5 is a longitudinal section view of the spring system shown in FIG. 4.

The air spring 2 shown in FIGS. 1 to 5 includes two air spring elements 4a and 4b which are mounted as mirror images to each other in a manner similar to the spring system mentioned initially herein. The air spring elements 4a and 4b have respective rolling-lobe flexible members 6a and 6b and respective roll-off pistons 8a and 8b.

In the present embodiment, the two rolling-lobe flexible members 6a and 6b define the undivided halves of a double rolling-lobe flexible member 6 which is made of elastomeric material reinforced with a fabric layer.

A cover plate, which is otherwise required in conventional air springs, is not necessary here because a support device (outer jacket) 10 is provided for laterally delimiting and longitudinally guiding the double rolling-lobe flexible member 6. The roll-off pistons 8a and 8b as well as the ends of the outer jacket 10 are configured to be slightly conical. The common inner space 12 of the double rolling-lobe flexible member 6 can be filled with air via one of the roll-off pistons 8a and 8b.

From the air spring arrangement shown in section in FIG. 3, it can be seen that the two roll-off pistons 8a and 8b are axially rigidly connected to each other via a pipe-shaped connecting piece 14. From FIG. 2, it can be seen that the forward wheel fork 16 of a bicycle or other two-wheel vehicle is formed of two air springs 2. The upper extensions of the roll-off pistons 8a are connected to the bicycle steering axis and are further connected to the frame of the bicycle; whereas, the lower ends of the two outer jackets 10 have receptacles for the attachment of the forward wheel.

In the same manner as with the deflection operation of the air spring system mentioned initially herein, a part 6b of the double rolling-lobe flexible member 6 is compressed with the aid of a roll-off piston 8b while, at the same time, the other part 6a of the rolling-lobe flexible member 6 is relieved of load with the aid of the other roll-off piston 8a. The spring action arises during the deflection because of the difference of the effective diameters. The effective area is a circular annular area delimited by the effective diameter of the small fold (lobe) and the effective diameter of the large fold (lobe). Additionally, a pressure increase occurs because of the compression of the gas volume in the interior space of the double fold of the double rolling-lobe flexible member 6; that is, in the event that the spring system 2 is filled with hydraulic fluid in lieu of air, there results an increase of the pressure in a pressure store.

A significant feature of the spring system of the invention lies in an axial clamping of the wall of the flexible member.

Forces act between the double rolling-lobe flexible member 6 and the outer jacket 10 when the bicycle is supported with the aid of the air spring system 2. A sliding of the double rolling-lobe flexible member 6 on the inner wall of the outer jacket 10 must be prevented. According to the invention, and for this reason, the wall of the flexible member is clamped to the outer jacket 10 and this is achieved with a fixation by means of an inserted ring 18 (see FIGS. 5, 6 and 8). This ring 18 is comparable to a flat seal known from the fields of plumbing and heating. The inserted ring 18 is, with its outer diameter, larger than the flexible member 6 in the pressureless state. In this way, the ring 18 can be reliably positioned in the flexible member 6 and the connection to the outer jacket 10 is easily possible.

Figure 6:
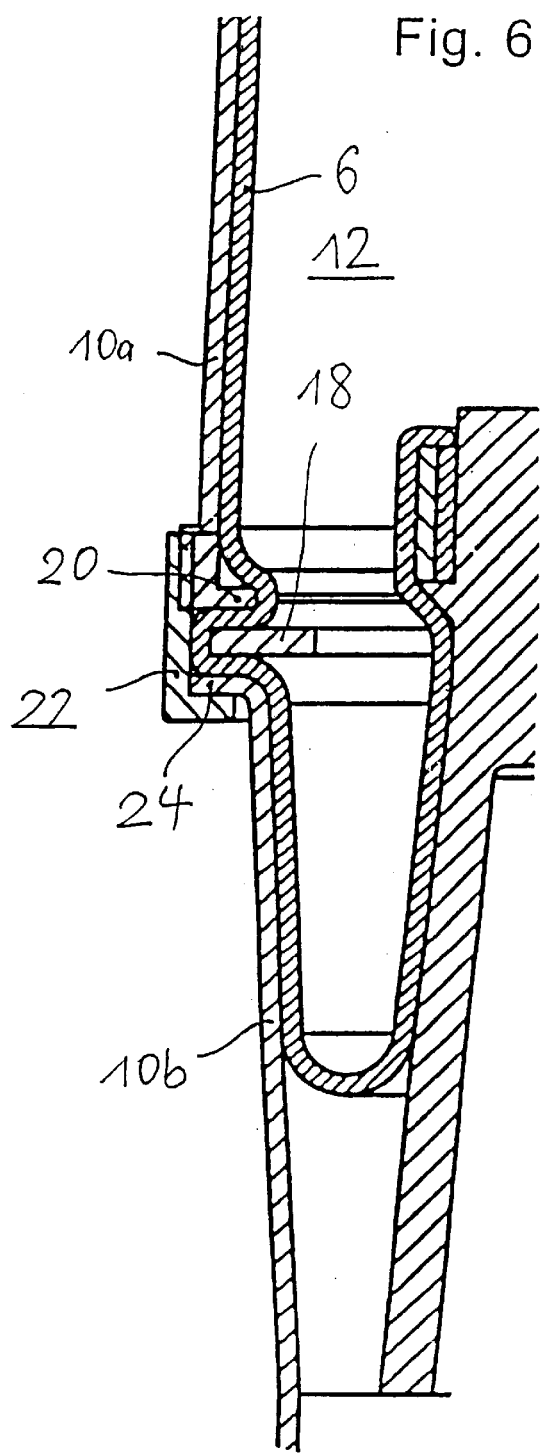
FIG. 6 is an enlarged cutaway view of a detail of FIG. 5.

The outer jacket 10 comprises two parts 10a and 10b whereof the one part 10a has a peripherally extending edge 20 bent over inwardly and an outer thread for threadably engaging a nut 22 (see FIG. 6). The other part 10b of the outer jacket 10 has an edge 24 which is bent over outwardly so as to come into contact engagement with the edge of the nut 22. The fixation and clamping of the double rolling-lobe flexible member 6 on the outer jacket 10 with the aid of the ring 18 takes place in such a manner that the one part 10a of the outer jacket 10 is pushed up to the ring 18 so that the inwardly bent-over edge 20 comes into contact against the ring 18 while clamping the wall of the flexible member therebetween. The outer part 10a of the outer jacket 10 is then pushed thereagainst until the edge 24 touches the other side of the ring 18 while clamping the wall of the flexible member therebetween. In this position, the nut 22 is screwed on for clamping the flexible member 6 and for connecting the two parts 10a and 10b of the outer jacket 10 to each other.

Figure 7:
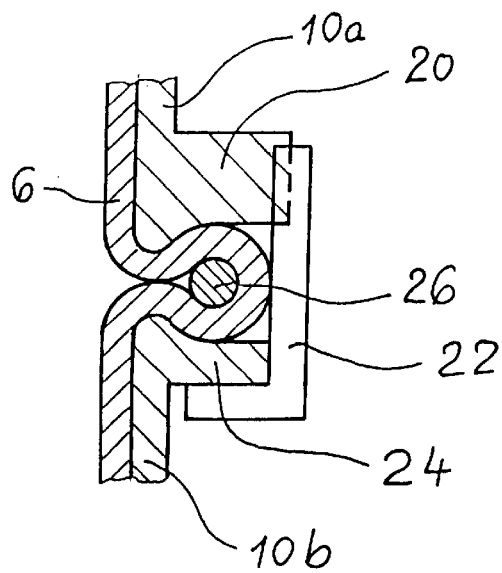
FIG. 7 shows an alternate configuration which includes a flexible round ring in lieu of the flat ring shown in the detail of FIG. 6; and, FIG. 8 is another alternative for fixing the flexible member similar to that shown in FIG. 6.

As shown in FIG. 7, a flexible round ring 26 can be used in lieu of a flat ring 18. The peripherally bent-over edges (20, 24) of the outer jacket parts 10a and 10b have suitable recesses for accommodating the round ring 26. Here too, the two outer jacket parts 10a and 10b are connected to each other while clamping the flexible member 6 fixed by the round ring 26.

Figure 8:
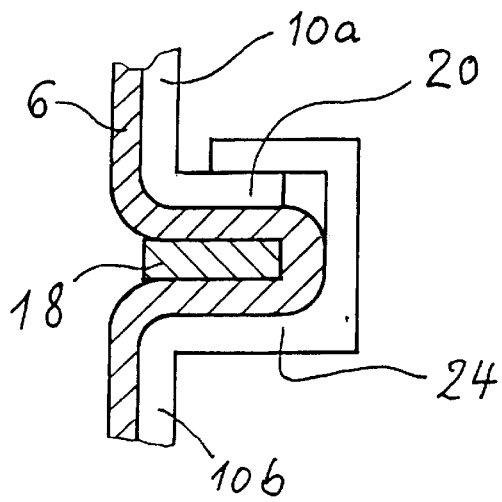

FIG. 8 shows an alternate embodiment wherein the fixing of the flexible member 6 takes place similarly to that shown in FIG. 6 by means of a flat ring 18. In lieu of a threadable engagement, the non-releasable connection of the two parts 10a and 10b is done with the aid of a flanging operation.

It is understood that the foregoing description is that of the preferred embodiments of the invention and that various changes and modifications may be made thereto without departing from the spirit and scope of the invention as defined in the appended claims.

What is claimed is:

1. A spring arrangement comprising:
    first and second spring components coaxially mounted in opposition to each other;
    said first spring component including a first rolling-lobe flexible member and a first roll-off piston;
    said second spring component including a second rolling-lobe flexible member and a second roll-off piston;
    said first and second rolling-lobe flexible members conjointly defining a common rolling-lobe flexible member having an interior;
    an outer jacket including first and second parts corresponding to said first and second spring components;
    said first and second parts having respective ends conjointly defining a common interface;
    said common rolling-lobe flexible member having a clamp ring arranged in said interior;
    said clamp ring being disposed between said ends with a portion of said flexible member being clamped between said ends and said clamp ring at said interface whereby a slippage of said flexible member relative to said outer jacket is prevented;
    said first part including a peripherally extending edge portion defining an external thread;
    said second part having an outwardly extending peripheral lip; and,
    a clamp nut placed over said peripheral lip and threadably engaging said external thread so as to join said first and second parts and cause said portion of said flexible member and said ring to be clamped between said first and second parts.

2. The spring arrangement of claim 1, wherein said clamp ring is a flat ring.

3. The spring arrangement of claim 1, wherein said clamp ring is a flexible round ring.

4. The spring arrangement of claim 3, wherein said round ring has a circular cross section.

5. A spring arrangement comprising:
    first and second spring components coaxially mounted in opposition to each other;
    said first spring component including a first rolling-lobe flexible member and a first roll-off piston;
    said second spring component including a second rolling-lobe flexible member and a second roll-off piston;
    said first and second rolling-lobe flexible members conjointly defining a common rolling-lobe flexible member having an interior;
    an outer jacket including first and second parts corresponding to said first and second spring components;

said first and second parts having respective ends conjointly defining a common interface;

said common rolling-lobe flexible member having a clamp ring arranged in said interior;

said clamp ring being disposed between said ends with a portion of said flexible member being clamped between said ends and said clamp ring at said interface whereby a slippage of said flexible member relative to said outer jacket is prevented; and, said first and second parts being joined to each other by a flanging process providing a flanged seam with said portion of said flexible member and said clamp ring clamped therebetween.

6. The spring arrangement of claim 5, wherein said clamp ring is a flat ring.

7. The spring arrangement of claim 5, wherein said clamp ring is a flexible round ring.

8. The spring arrangement of claim 7, wherein said round ring has a circular cross section.

* * * * *